A. W. REYNOLDS.
ONE HORSE SULKY CULTIVATOR.
APPLICATION FILED AUG. 21, 1919.
1,339,864.
Patented May 11, 1920.
2 SHEETS—SHEET 2.
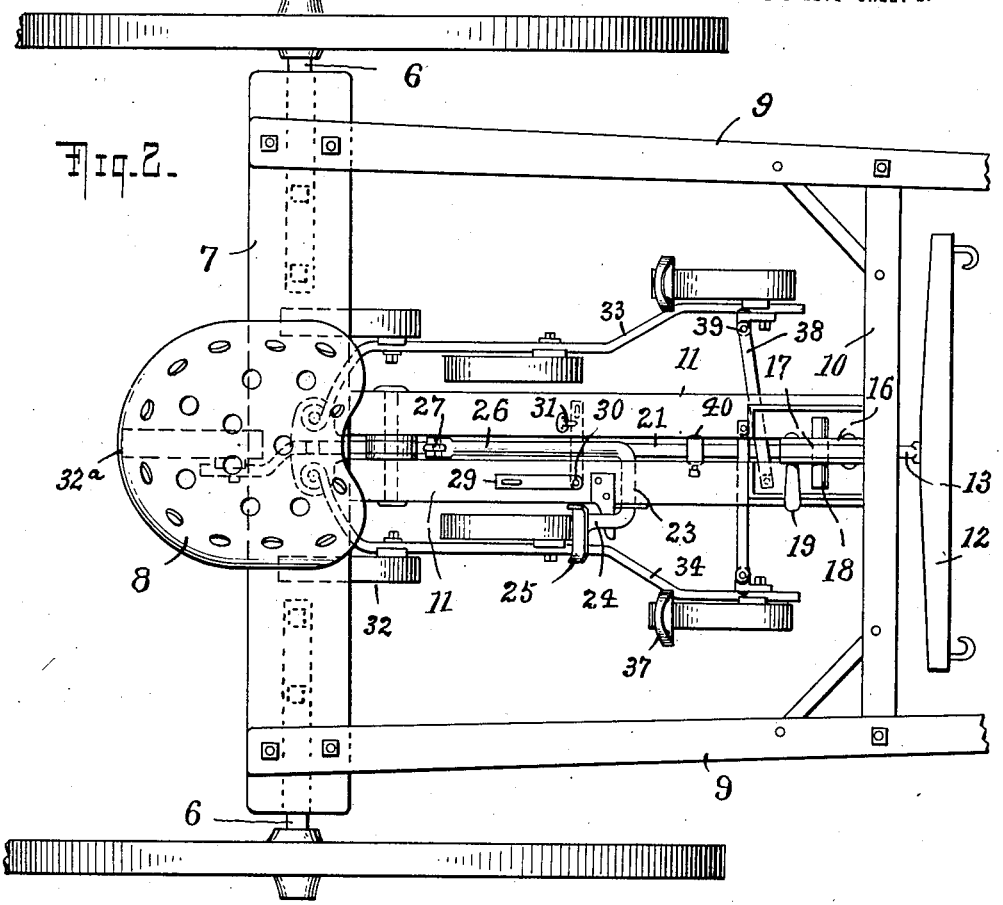
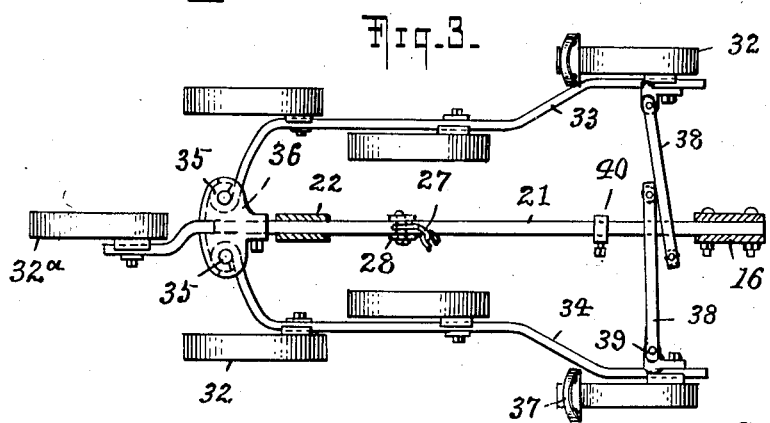
Inventor
Arthur W. Reynolds
By Chamberlain & Newman
Attorney

UNITED STATES PATENT OFFICE.

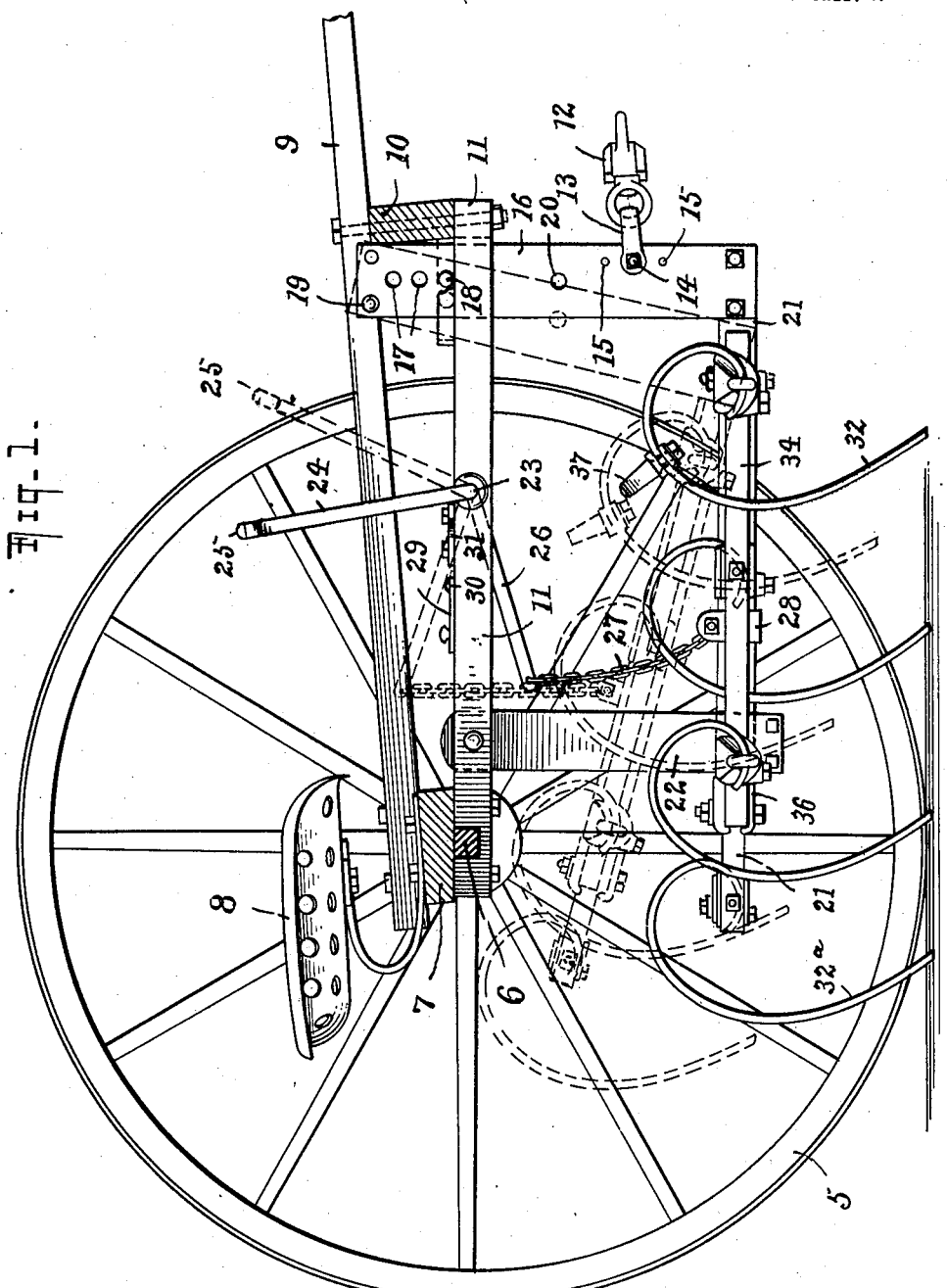

ARTHUR W. REYNOLDS, OF NEWTOWN, CONNECTICUT.

ONE-HORSE SULKY-CULTIVATOR.

1,339,864.   Specification of Letters Patent.   Patented May 11, 1920.

Application filed August 21, 1919. Serial No. 318,875.

*To all whom it may concern:*

Be it known that I, ARTHUR W. REYNOLDS, a citizen of the United States, and resident of Newtown, in the county of Fairfield and State of Connecticut, have invented certain new and useful Improvements in One-Horse Sulky-Cultivators, of which the following is a specification.

My invention relates to new and useful improvements in cultivators and refers especially to a one-horse sulky, or riding cultivator.

The purpose of the invention is to provide a simple and inexpensive form of riding cultivator which may be drawn by one horse so that the teeth of the cultivator will follow the horse between two rows of plants, while the two wheels supporting the cultivator will run between the two adjoining rows. To provide a simple form of foot lift whereby the operator raises and lowers the cultivator teeth without taking his hands from the driving lines or stopping the horse, when turning. Further to design the cultivator so that the whiffle tree will be directly connected to the gang of cultivator teeth and indirectly connected to the sulky, and also to provide means for further raising and supporting the cultivator teeth from the ground when traveling over the road or between fields.

Another improvement as incorporated in my invention resides in means whereby the driver may independently move the two side gangs of cultivator teeth, with his feet, so as to avoid plowing out any plants and still closely follow the same on curves or narrow places between the rows of plants, the gangs being normally set for cultivating the widest distance between rows and moved in by the operator if desired.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which;

Figure 1 shows a longitudinal vertical sectional elevation of my improved form of sulky cultivator, the shafts being broken away.

Fig. 2 is a top plan view of the cultivator shown in Fig. 1, the wheels and shafts also being broken away, and Fig. 3 shows a disconnected plan view of the cultivator teeth and supporting frame therefor.

Referring in detail to the characters of reference marked upon the drawings, 5 represents the wheels of the cultivator and 6 the wheel spindles which are secured to the cross beam or axle 7. A seat 8 is supported on the central portion of this axle and directly in line with the center of the shafts and above the gang of cultivator teeth. The two shaft members 9 are bolted to the axle as shown and are provided with a cross member 10 which is positioned parallel to and forward of the axle.

A pair of longitudinal beams 11 which are spaced apart and arranged parallel with each other and the central part of the sulky frame, and have their forward ends secured to the cross member 10 and the rear ends to the axle. These beams serve as a part of the frame portion of the sulky and as a support for the gangs of cultivating teeth and mechanism for operating the same. As will be seen the cultivating teeth including the frame for carrying the same are arranged centrally between the two sulky wheels and are flexibly hung from the longitudinal beams, being supported forward and aft in a way to be susceptible of a limited amount of longitudinal movement necessary to permit the cultivator teeth to be drawn forward through the soil and to yieldably rise over stones, roots or other obstructions.

The whiffle tree 12 to which the horse is attached is directly connected to the forward portion of the cultivator frame through the medium of a clevis 13 and bolt 14 which latter may be positioned in either of the holes 15 of the hanger 16. The upper portion of this hanger is slidably mounted between the two longitudinal beams 11 and is provided with a series of holes 17 in either of which the pin 18 may be positioned. The end portion of the said pin rests upon the top of the longitudinal beams in a way to support the hanger and its cultivator frame at any desired height to regulate the depth of cultivation. A handle 19 is positioned upon the upper end portion of this hanger to permit the same to be readily raised or lowered for the purpose of shifting the position of the pin.

When it is desired to also raise the forward end of the cultivator frame in addition to the rear end, from the position shown in dotted lines in Fig. 1, the hanger 16 is lifted and the pin 18 removed and positioned in a lower hole 20 which would then be positioned above the surface of the longitudinal beams. From the foregoing it will be seen that the forward hanger is rigidly connected to the central draw-bar 21 of the cultivator frame whereas the rear portion of said draw-bar is slidably mounted between the two guide plates 22 which are spaced one from the other but secured together top and bottom and positioned vertically side by side and have their upper end portions bolted to and between the above mentioned longitudinal beams 11. This permits the rear portion of the draw-bar 21 to slide vertically between the said plates 22 when the cultivator frame is raised, by means of the bell crank lever and chain connections next to be described.

23 represents a rocker shaft which is journaled in one of the longitudinal beams 11 and has an upwardly disposed arm 24 with a foot pedal 25 formed upon its end portion. 26 represents a second arm that extends rearward from the rocker shaft and to which one end of a chain 27 is connected. The other end of this chain is fastened to a bolt carried by a clevis 28 secured to the draw-bar 21. This rocker shaft with its extended arms, is normally positioned as indicated in full lines in Fig. 1, when the cultivator is in operation but is readily shifted by the operator pressing his foot upon the pedal and shoving the upper arm 24 forward in a manner to raise the lower arm, the chain and cultivator frame, as indicated by dotted lines in Fig. 1 for the purpose of raising the cultivator teeth from the ground, when the ends of the rows are reached and when it is desired to turn around and start in to cultivate the adjoining row. If the machine is to be drawn any distance in this manner, or with the forward end also raised, the mechanism just described including the arms may be secured in said raised position through the medium of a dog 29 which is pivoted at 30 to the longitudinal beam and adapted to be swung in under the arm 24 and positioned back of a lug 31 upon the adjoining beam so as to form a fixed support for the arm and the load hanging thereto, until such times as the gang of cultivator teeth are to be again lowered for further operation.

The cultivator teeth 32 are mounted in a frame which in addition to the draw-bar 21 (see Fig. 3) includes two side members 33 and 34 that are pivotedly connected at 35 to a bracket 36 secured to the draw-bar and immediately in the rear of the plates 22. The cultivator tooth 32ª is secured to the rear end of the draw-bar and in alinement therewith so as to normally operate centrally between two rows of plants. The two side members 33 and 34 are substantially alike in construction, except that one is a right and the other a left, and each is provided with three cultivator teeth, two upon the outer side of the member and one upon the inner side, and positioned and arranged so that one will not aline with the other. The foremost tooth on each side section is provided with a stirrup 37 wherein the operator positions his feet, and whereby the forward end portion of the respective gangs of teeth may be moved inward and outward to closely follow the curves in rows as hereinbefore described. The outward movement of the forward ends of these two gangs of teeth are limited by a yoke 38 one end of which is pivotedly attached to the side member at 39 while the inner end straddles and encircles the draw-bar 21. The inner end portion of these yokes slidably engage the draw-bar, immediately behind the hanger 16 and are free to slide crosswise thereon when the forward ends of the side members and the teeth carried thereon are drawn inward by the foot of the operator. A stop 40 is positioned upon the draw-bar to confine the movement of the end of the yoke to the forward end portion of the draw-bar.

Having thus described my invention, what I claim and desire to secure by Letters Patent, is:

1. A sulky cultivator of the class described, comprising a main frame, a gang of cultivator teeth mounted on a central bar beneath the main frame, a hanger secured to the forward part of the gang of cultivator teeth and pivotedly and adjustably connected to the forward end portion of the main frame, depending guide members attached to the main frame, and inclosing the central bar for supporting the cultivator teeth, a crank arm mounted in the main frame for raising and lowering the rear portion of the gang of cultivator teeth, and a locking device pivoted to the main frame and adapted to engage the crank arm for supporting the arm in such raised position.

2. A sulky cultivator of the class described, comprising a frame and wheels for supporting the same, said frame including a longitudinal beam, a gang of cultivator teeth mounted on a central bar beneath the beam, a hanger secured to the forward end of the gang of cultivator teeth and pivotedly connected to the forward end of the sulky frame, depending guide members attached to the beam forming a guide for the central bar supporting the gang of cultivator teeth, a whiffle tree attached to the forward hanger, foot operating means for raising and lowering the rear portion of the gang of cultivator teeth from the ground, a dog pivoted to the frame and adapted to engage the foot-operating means to lock the cultivator teeth elevated, and means for raising and lowering and supporting the forward portion of the gang of cultivator teeth.

Signed at Bridgeport, in the county of Fairfield and State of Connecticut, this 18th day of August, A. D. 1919.

ARTHUR W. REYNOLDS.

Witnesses:
C. M. NEWMAN,
LILLIAN M. ALLING.